June 22, 1937. A. CAPELLO 2,084,941
MEANS FOR LIFTING VEHICLES
Filed Dec. 29, 1934   3 Sheets-Sheet 1
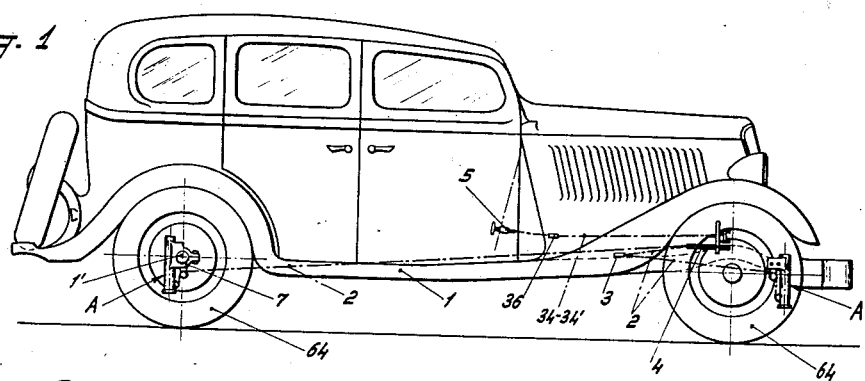
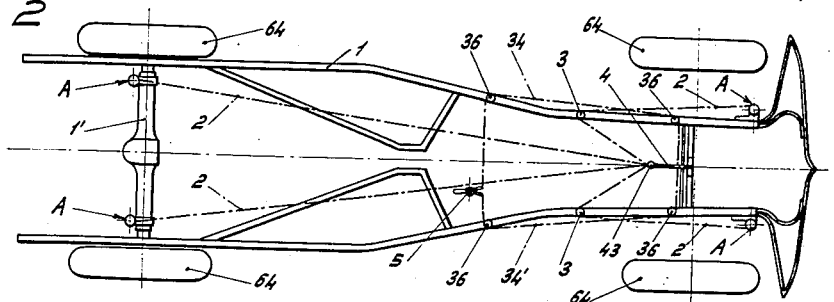
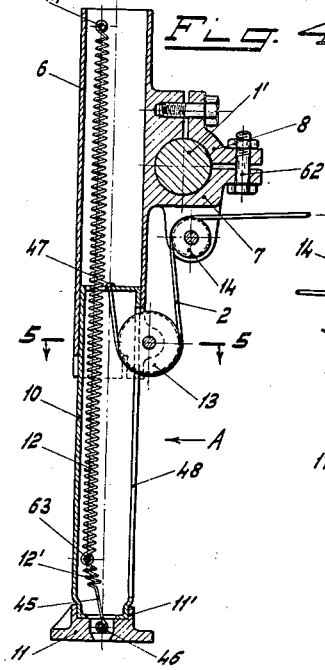
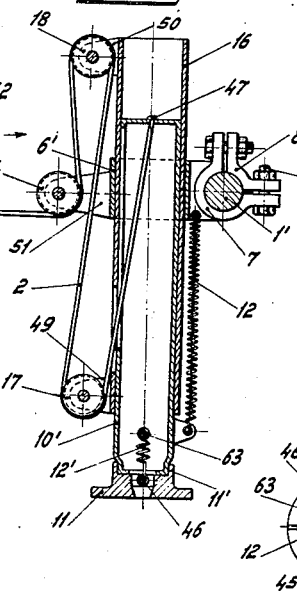
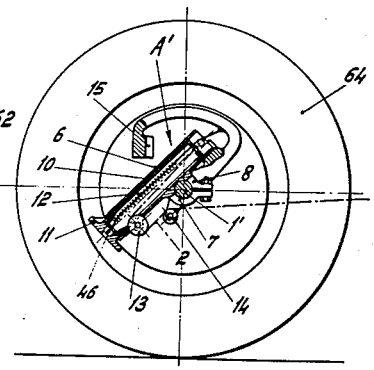
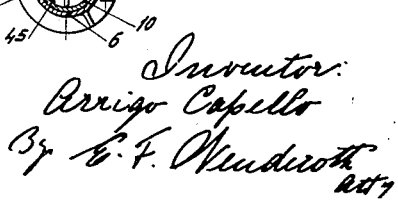
Inventor:
Arrigo Capello

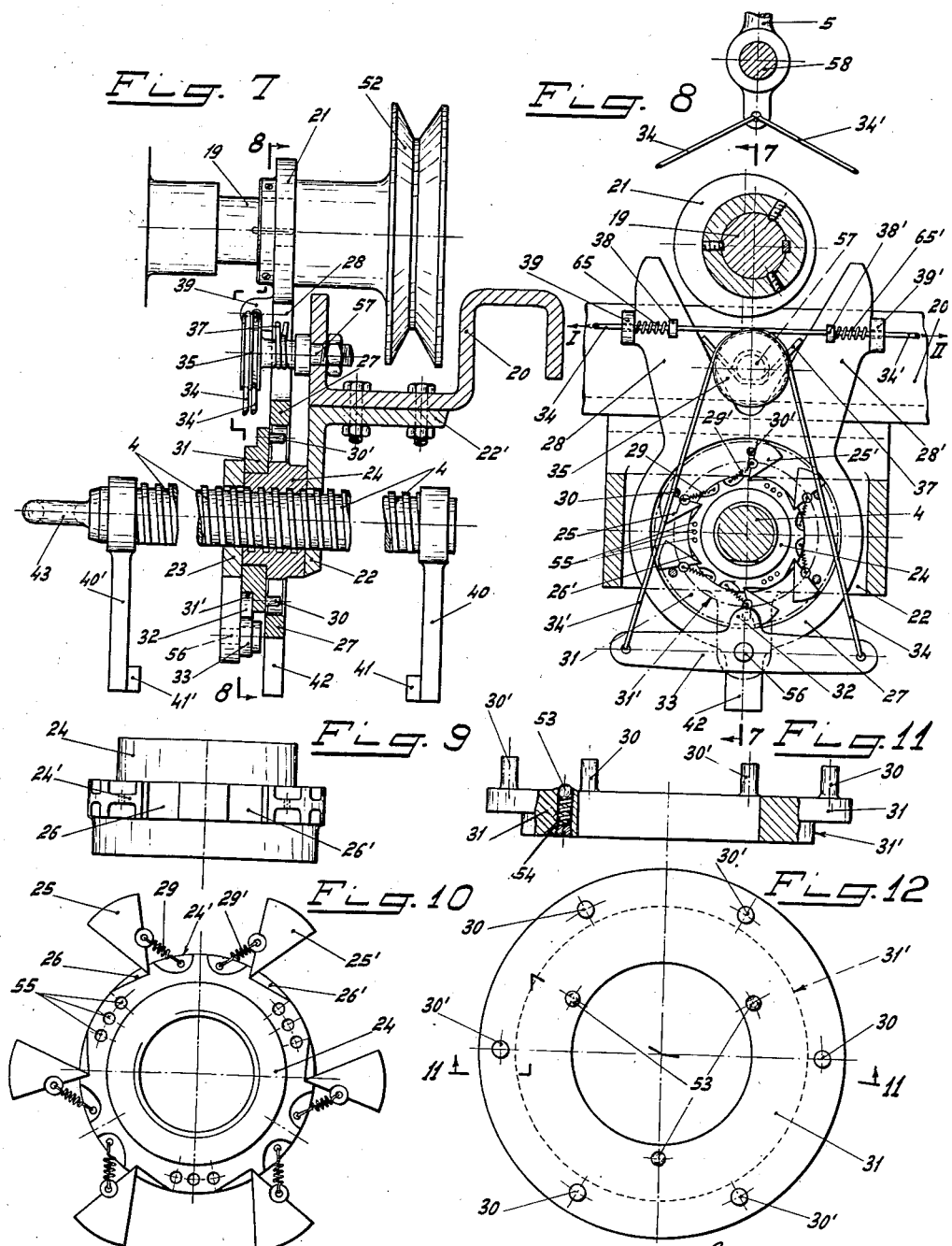

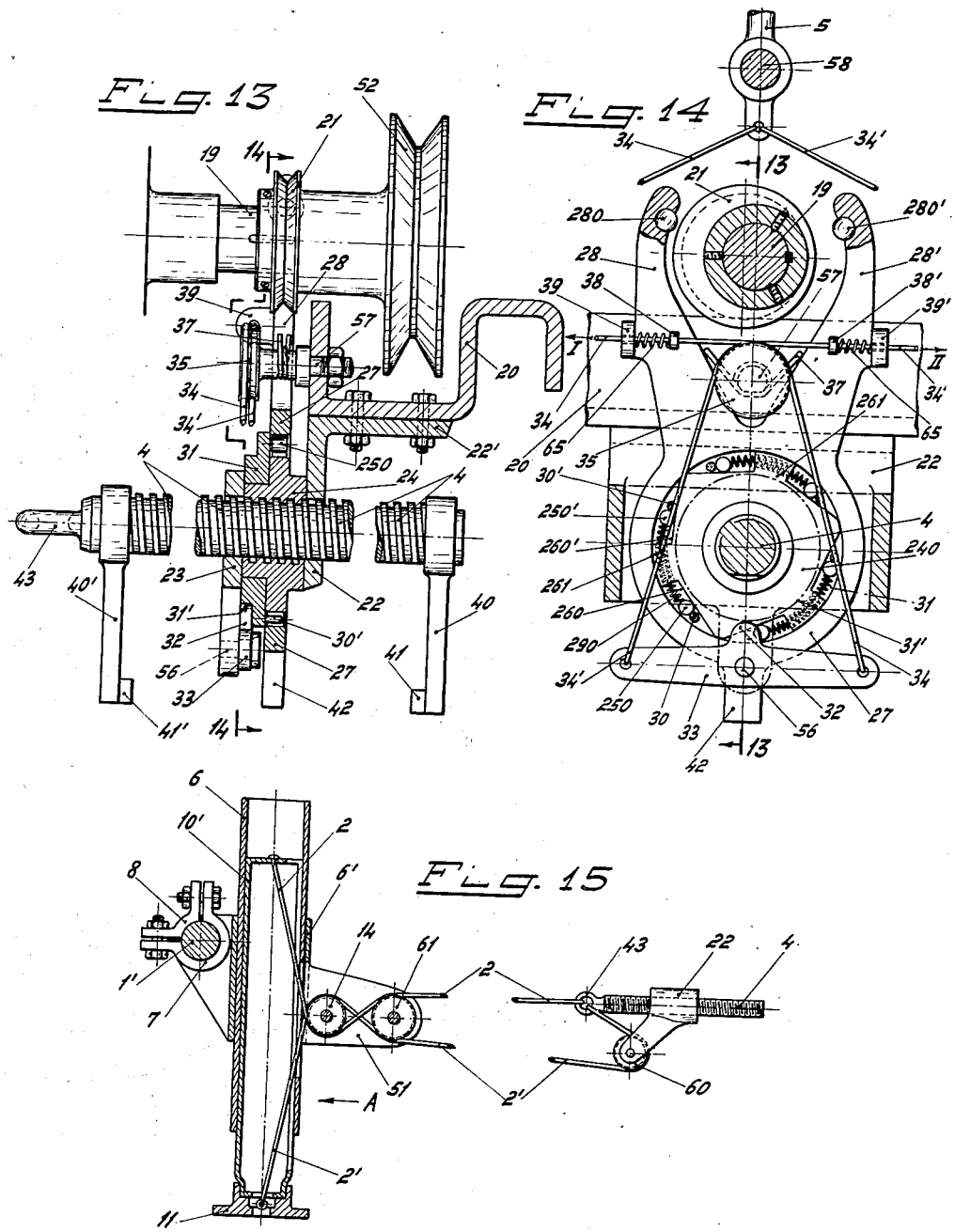

Patented June 22, 1937

2,084,941

UNITED STATES PATENT OFFICE 2,084,941

MEANS FOR LIFTING VEHICLES

Arrigo Capello, E. Echeverria (F. C. S. Buenos Aires), Argentina

Application December 29, 1934, Serial No. 759,782
In Italy January 3, 1934

5 Claims. (Cl. 254—86)

This invention relates to means intended to be embodied in vehicles, particularly in motor vehicles, for the purpose of lifting them bodily and including extensible legs or equivalent elevating supports which are actuated in unison by central means usually under the drive of the vehicle engine.

More particularly, the present invention has for its object means of the above stated class in which the several extensible legs are carried into their operative or inoperative position under the action of a central device with the cooperation of flexible tension members.

In the device of this invention the transmission of the actuation to extensible legs is secured in most simple manner and the device has in its whole a reduced weight, is inexpensive and may be easily embodied in vehicles of any class, without interfering with other devices or parts of the vehicle.

This invention also includes a transmission device with a highly reduced ratio for imparting the engine drive to a member connected with tension members which in turn are connected with several extensible legs, as well as constructions of telescopic extensible and collapsible legs which are particularly adapted for the purpose they are intended to.

This invention also comprises further features hereinafter described.

Embodiments of this invention in a motor vehicle are shown diagrammatically on the annexed drawings, and Figure 1 is a side view of a motor vehicle equipped with the present invention, with parts removed;

Figure 2 is a plan view of the vehicle frame showing the arrangement of the parts of the device;

Figure 3 is a fragmentary view showing a modified construction of a lifting leg according to this invention as mounted on a vehicle wheeled axle;

Figure 4 is the central section of a lifting leg;

Figure 5 is a transverse section on line 5—5 of Figure 4;

Figure 6 is a vertical section of a modification of said lifting leg.

Figure 7 is a central section of the gear intended to receive the engine actuation and to impart it to several lifting legs said section being made on line 7—7 of Figure 8, with parts omitted;

Figure 8 is a view of the gear of Figure 7 with parts in section on line 8—8 of Figure 7 and showing means for operating said gear;

Figure 9 is a side view of the driven member of said gear at an enlarged scale with respect of Figures 7 and 8;

Figure 10 is a front view of the member illustrated in Figure 9.

Figure 11 illustrates another member of the gear in section on line 11—11 of Figure 12 and on enlarged scale;

Figure 12 is a front view of the member of Figure 11;

Figure 13 is a section on line 13—13 of Figure 14 of a modified gear, with parts removed;

Figure 14 is a section on line 14—14 of Figure 13;

Figure 15 shows diagrammatically, with parts in section, a modified construction of lifting leg with means for actuation and return thereof.

As illustrated more particularly in Figures 1 and 2 in connection with a conventional motor vehicle shown diagrammatically, four lifting legs each referred to in its whole by A, are arranged in appropriate locations and in vertical position on the vehicle frame and on the rear axle 1'; as illustrated each of said legs A is located adjacent one of the vehicle wheels 64 and is able of being extended in the direction of its own axis, or generally of producing an increase in the distance between its bottom shoe and its point of connection with the vehicle frame parts 1 and 1'.

Each of said legs A is operated by a cable 2 which is guided and supported on a sheave 3; the opposite ends of said cables 2 are connected with an actuating device 4 hereinafter described which in turn is operated under the action of the vehicle engine to impart the desired actuation to the lifting legs A.

The arrangement further comprises a device which includes a control member 5 located within reach of the vehicle driver and acts to hold in operation a gear intended to drive said cable actuating device 4.

The lifting legs A may consist each of a structure adapted to modify the distance intermediate its shoe and the point of its attachment on the vehicle frame parts. A leg of this class may have a telescopic construction comprising a tubular element secured on the frame and a second element mounted to telescope longitudinally within the first one and carrying a bottom shoe.

Figures 4 and 5 illustrate a leg of the above-stated class adapted for being fastened in vertical position on the rear axle 1' of the vehicle. As to legs A to be mounted adjacent front or steering wheels, the stationary members of said legs are provided with means for fastening them say on the side bars of the vehicle frame or on the front axle or on parts solid therewith.

In the construction illustrated in Figures 4 and 5, each lifting leg A comprises a sleeve 6 having a transverse collar consisting of stationary and removable straps 7 and 8 adapted to be fastened on a vehicle axle as 1' by means of bolts 62 interconnecting them.

To secure leg A in position on a rear axle of a vehicle, as 1', said leg is affixed in vertical position thereon by its strap 7 and then strap 8 is clamped in position by means of bolts 62, as shown in Figures 1 and 4.

A tubular stay 10 is mounted to slide within sleeve 6; said stay 10 has its bottom end seated in a seat provided by projections 11' of a shoe 11 which is resiliently held in position by a spring 12 having its top end connected at 44 with the top of sleeve 6 and its bottom end connected with the stay 10 by means of a transverse pin 63 while said stay 10 in connected with shoe 11 by means of a tie 45 and a transverse pin 46 fastened in said shoe 11, said spring being enclosed in said tubular member 6, 10.

With the top of tubular stay 10 is connected the head 47 of a cable 2 extending through a longitudinal slot 48 and guided by sheaves 13 and 14 pivoted on sleeve 6 and on stationary strap 7; by the described arrangement an horizontal pull on the limb of cable 2 lying within the vehicle frame produces an outward or downward action on the tubular stay 10 and vice versa.

In the illustrated construction each leg A is usually held in collapsed condition because the spring 12 acting on respective shoe 11 tends to cause the stay 10 to enter within sleeve 6 when no pull acts on cable 2; when a pull is exerted on cable 2, said stay 10 is caused to extend from sleeve 6 and therefore, due to the vertical position of sleeve 6 on the vehicle frame, the shoe 11 is firstly carried in engagement with ground and then the vehicle is lifted by the further extension of legs A.

Figure 3 illustrates a construction in which a leg A' instead of being fastened vertically on the vehicle frame is mounted to oscillate thereon; by this construction the extensible leg A' may usually be swung off from its vertical position to enlarge its distance from ground when inoperative, while at the time of operation the action of cable 2 on sheaves 13 and 14 pivoted on sleeve 6 firstly swings said sleeve and leg A' into vertical operative position and then causes the extension of said leg to lift the vehicle.

In the construction of Figure 3 the collar 7—8 solid with sleeve 6 is journalled on the vehicle axle 1' and the vertical operative position of the leg A' is defined by a strap 15 fastened on the vehicle axle 1' and adapted to engage the top portion of said lifting leg A'.

In order to extend the lifting stroke of legs A or A', the construction illustrated in Figure 6 may be used, where collar 7—8 carries a ring 6' and a tubular stay 16 is mounted to slide in said ring 6' while a further tubular stay 10' having the bottom shoe 11 is mounted to reciprocate within said tubular stay 16. The stay 10' is connected with the collar 6' by means of a spring 12 and with the shoe 11 by means of a spring 12' attached to transverse pins 63 and 46.

The actuating cable 2 is connected with the top end of stay 10' and passes on a sheave 17 journalled on a bottom lug 49 of stay 16; then said cable runs over a sheave 18 journalled in a top lug 50 of said stay 16 and finally over a sheave 14 journalled on a lug 51 of ring 6'.

Thus a pull exerted on cable 2 causes the stay 10' to extend from stay 16 and this stay 16 to move down through ring 6', the extent of possible stroke of shoe 11 being thus increased. A spring 12 acts to return the parts into their normal position.

By the provision of extensible or extensible and swinging legs as above described at four suitable locations on the vehicle frame, it is thus possible to lift bodily the vehicle over such four legs A or A' by producing a pull at the same time on all cables 2 operating said four legs.

The described operation of the cables 2 and legs A or A' may be effected by any suitable means as by a winch having a hand-operated shaft and adapted to wind up cables 2 leading to four legs A or A', but the preferred construction of this invention includes a gear adapted to pull said cables 2 and to be coupled for desired operation with the shaft of the vehicle engine or with a shaft driven by such engine shaft.

This invention also includes means for taking the drive of the engine shaft from a portion of said shaft to which an easy access may be had also in respect of engines organized and located in conventional manner on the vehicle frame, and more particularly from the exposed portion of said shaft carrying the conventional means for coupling it with the starting handle.

This invention also includes a gear for the above stated purpose which is adapted to impart the engine drive to cables 2 under a very reduced ratio and is also able of reverse operation to produce both the lifting stroke and the down stroke under controlled conditions.

A construction of said gear is illustrated in Figures 7 and 8 in which 19 is the front end of the engine crank shaft which is usually provided with a coupling for a starting crank handle and with means as a grooved pulley 52 for driving other parts of the engine; for the purposes of this invention said crank shaft 19 is provided with a cam member 21 suitably fastened thereon. The gear above referred to comprises a casing consisting of interconnected sections 22 and 23 and having a flange 22' for fastening it on a transverse bar 20 of the vehicle structure. Said casing sections 22 and 23 are provided with aligned horizontal holes through which a screwthreaded spindle 4 is loosely inserted. The spindle 4 is engaged in a nut 24 located intermediate casing sections 22, 23 and having on its periphery a number of reverse ratchet recesses 26, 26' adapted to cooperate with pawls 25, 25'; each pawl 25, 25' has a sector shape with its apex engaged in one of said recesses 26, 26' and is connected with nut 24 by means of a tension spring 29, 29' each engaged with a lug of the respective pawl and a lug 24' of nut 24. On the outer rim portions of sector pawls 25, 25' is seated a collar 27 encircling them and having two angularly spaced arms 28, 28' which embrace cam 21 for actuation thereby, the angular span intermediate arms 28, 28' permitting said arms 28, 28' and collar 27 to be unaffected by cam 21 during the revolutions of cam 21 when said parts 27, 28—28' are in intermediate position.

Pawls 25, 25' are inclined in reverse directions to cooperate with reverse ratchet recesses 26, 26' and exert reverse tangential actions on nut 24 under the oscillation imparted thereto by collar 27 when either arm 28—28' of said collar is caused to cooperate with cam 21; in other words pawls 25 and recesses 26 are directed in an opposite direction with respect to pawls 25' and recesses 26' and thus said pawls and recesses provide two sets of means each operative to drive nut 24 in either direction.

In register with the leading edge of each pawl 25, 25' and therefore on opposite edges of pawls 25, 25' of the two sets, is located a transverse finger 30, 30'; these fingers 30, 30' are carried by a ring 31 (Figures 10 and 11) which is loose on nut 24 and is adapted to be engaged therewith in two spaced angular positions by means of balls 53 acted on by springs 54 and adapted to enter cooperating recesses 55 of nut 24.

An arm 33 is pivoted on a stationary member as a bottom pivot 56 of casing 22, 22', and said arm 33 has a finger 32 frictionally engaging the rim 31' of ring 31.

Cables 34, 34' are connected with the ends of arm 33 said cables running over a loose sheave 35 journalled on a pivot 57 fast on cross member 20; said cables 34, 34' extend in opposite directions from sheave 35 and they run over guiding sheaves 36 (Figure 2) to reach the manipulating member 5 to which they are connected.

A spring 37 is wound on the pivot 57 of sheave 35 and it acts on the opposite arms 28, 28' to hold them with collar 27 in intermediate inoperative position with respect to cam 21. Driving dogs 38, 38' are fastened on cables 34, 34' in position to alternatively engage cooperating perforated wings 39, 39' of arm 28, 28' through which extends the limb of respective cable 34, 34'.

A spring 65, 65' is conveniently located on each cable 34, 34' intermediate each dog 38, 38' and cooperating wing 39, 39' to provide a lost-motion connection for free oscillation of member 27—28—28' under action of cam 21 after either of arms 28, 28' has been carried by respective dog 38, 38' through said associate spring into position for cooperating with said cam.

The screwthreaded spindle 4 has an arm 40, 40' rigid therewith at each end; each of said arms 40. 40' has at its free end and on its internal side a slope or cam surface 41, 41' intended to engage a tail 42 of collar 27. Said cam surfaces 41, 41' extend in opposite directions on said two arms 40, 40' and they are located to engage said tail 42 of collar 27 on its opposite sides, the collar 27 being thus oscillated in a direction or in the opposite one according to which of said arms 40, 41 or 40', 41' engages said tail 42.

A ring 43 is further fastened on one end of screwthreaded spindle 4 and the ends of cables 2 leading to several lifting legs A or A' are connected with said ring 43 which thus acts to produce a pull on the cables 2 for the purpose of lifting the vehicle.

The described device may be embodied in different manners and Figures 13 and 14 illustrate a construction in which rollers 250, 250' are used instead of pawls 25, 25' said rollers being engaged in oppositely sloping recesses 260, 260' of the rim of nut 240 for cooperation in opposite directions with the internal surface of collar 27. The adjacent rollers 250, 250' cooperating with opposite sloping recesses 260, 260' of nut 240 are acted on by a common spring 290 extending throughout a bore of projection 261 intermediate said recesses 260, 260' and fingers 30, 30' of a ring as 31 cooperate with said rollers for their control. The operation is the same as above, the oscillation of fingers 30, 30' causing either of said sets of rollers 250 or 250' to cooperate with collar 27 and nut 240 for actuation of screwthreaded spindle 4 in either direction.

In this construction the ends of arm 28, 28' are provided with antifriction means as balls 280, 280' for cooperation with cam 21.

The actuation of screwthreaded spindle 4 may be secured by any other suitable gear, by a front cam or by a member having a sloping portion operative on said spindle as described in respect of cam 21, or also by a pawl or ratchet gear; generally speaking any gear adapted to impart a slow motion to a member producing a pull on cables 2 may be used.

The control member intended to shift cables 34, 34' comprises a handle arm 5 fulcrumed on a stationary pivot 58 and having the ends of cables 34, 34' connected therewith, to shift them with their dogs 38, 38' with respect to arms 28, 28' of collar 27 as hereinafter described.

In the conditions illustrated in Figures 7 and 8 the device is in inoperative position, and when the engine shaft 19 is operative the cam 21 rotates intermediate the arms 28, 28' of collar 27 without actuating them.

Assuming the engine is running and its shaft 19 is revolving, when the vehicle driver desires to lift up his vehicle he shifts the control member 5 in proper direction to move the cable 34 in the direction of arrow I in Figure 8, and holds said member 5 so shifted.

Said actuation of cable 34 causes dog 38 to engage the wing 39 of the left hand arm 28 and to oscillate leftward (as viewed in Figure 8) said arm with collar 27 thus causing its right hand arm 28' to abut against the rim of cam 21 for actuation thereby; therefore at each revolution of shaft 19 and cam 21 the collar 27 is oscillated against action of return spring 37. At the same time the displacement of cable 34 in the direction of arrow I swings the arm 33 to lift its right-hand end (Fig. 8) and then the projection 32 causes ring 31 to oscillate with respect to nut 24. When said ring 31 is so shifted with respect to nut 24, its fingers 30, 30' are shifted from their position illustrated in Fig. 8, and the fingers 30 which were previously adjacent to pawls 25 are removed therefrom while fingers 30' act on pawls 25' removing them from their contact with the internal surface of collar 27.

Thereafter every oscillation of collar 27 as produced by cam 21 on the arm 28' contacting therewith causes by the intermediate of collar 27 and pawls 25 and ratchet recesses 26 the nut 24 to rotate through an angle in one direction and the screwthreaded spindle 4 is moved towards right hand (Figure 8) thus imparting a pull to all cables 2 connected with the ring 43 thereof.

Then each of said cables 2 produces in the above stated manner the downward motion of stay 10 (or 16, 10') connected therewith and of the respective shoe 11 and thus the several legs A are extended, they lifting the vehicle in the final portion of their stroke after shoes 11 are abutting on the ground. In spite of the large reducing ratio of the above described gear said operation is effected in a short time in view of the high velocity of the engine shaft and on account of the short stroke the screwthreaded spindle 4 is required to develop.

The motion of screwthreaded spindle 4 under the action of the described device is automatically stopped at the end of a predetermined stroke of said spindle. This operation occurs under the action of left hand arm 40 which carries its slope surface 41 towards one side of tail 42 of collar 27 and thus restricts the oscillation of said collar and holds it in its intermediate position as illustrated in Figure 8, such position corresponding with the interruption of actuation; on the driver releasing the control member 5 the collar 27 and parts connected therewith are held in the above stated position by spring 37.

When the vehicle is again to be moved down, the operator shifts the control member 5 on the reverse side than before and then the cable 34' is pulled in the direction of arrow II (Figure 8); then dog 38' acts on wing 39' and carries arm 28 into engagement with the rim of cam 21 while the left end of lever 33 is lifted. Then the ring 31 is oscillated and by means of its fingers 30, 30', it releases pawls 25 and makes pawls 25' operative with respect to recesses 26'; the collar 27 is thus oscillated to impart to nut 24 a rotation in a reverse direction with respect to previous one and therefore the screwthreaded spindle 4 is moved leftward in Figure 7.

Then the cables 2 permit the legs A or A' to collapse and the vehicle to move slowly down under the action of its own weight until the vehicle wheels again abut on the ground; finally said legs are released to be collapsed into their normal configuration under the action of return springs 12.

When the return or collapse of legs is completed the gear is again made inoperative under the action of right-hand arm 40' whose slope 41' engages the tail 42 of collar 27 on the reverse side with respect to the previously described operation and carries said collar 27 in its intermediate inoperative position.

In the construction of Figures 13 and 14 the same operation as above occurs, pawl rollers 250, 250', springs 290 and recesses 260, 260' cooperating under the control of fingers 30 or 30' to impart the drive of cam 21 in either direction to nut 240; anti-friction means 280, 280' of arm 28, 28' improve the conditions of operation.

A similar action as above described occurs in respect of swinging legs A' of Figure 3. On a pull being imparted to respective cable 2 it firstly causes the said leg A' to take a vertical position until the stationary strap 15 is engaged, and then the leg is extended as above described; when the cable 2 is released the cooperating leg is permitted of collapsing and of swinging back into inoperative position under action of its return spring.

Figure 15 shows a construction of leg A or A' in which the collapsing and return means comprise a cable 2' actuated by spindle 4 to the same extent and in reverse direction with respect to lifting cable 2; as illustrated the casing 22 carries a sheave 60 and the lug 51 of ring 6' carries a further sheave 61, and a cable 2' passing on sheaves 60, 61 and 14 has one end connected with ring 43 of screwthreaded spindle 4 while its other end is connected with bottom end of stay 10'. The actuating cable 2 on the contrary passes on sheaves 61 and 14 and acts on the top end of stay 10' as above described.

On screwthreaded spindle 4 being operated for lifting the vehicle, it exerts a pull on cable 2 and pays out return cable 2' to provide for extension of respective leg; a reverse operation occurs when screwthreaded spindle 4 is driven in opposite direction for the downward motion of the vehicle.

The device of this invention provides for lifting the vehicle bodily by means of simple means having a rapid and safe operation and able to be easily embodied in operative position on any existing motor vehicle, while the central actuating means require a reduced overall space and may be coupled with the shaft of the vehicle engine at a point thereof to which an exceedingly easy access may be had it being sufficient to fasten an eccentric or cam member on said shaft.

Further, as described, the operator may carry out the desired operation by a mere manipulation of member 5 without having to step down from his seat on the vehicle.

What I claim as my invention and desire to secure by United States Letters Patent is:—

1. Means for lifting a vehicle comprising extensible stays mounted on the vehicle, each of said stays including a part mounted to swing through an angle on said vehicle and a movable part mounted to telescope with respect to said part, a flexible member connected with said movable part, guiding means on said part for said flexible member, an operating member connected with all said flexible members, means for shifting said operating member to cause said parts to swing on said vehicle and said movable parts to extend therefrom, and return means for said swinging and movable parts.

2. Means for lifting a motor driven vehicle comprising extensible stays mounted on said vehicle, means for producing the extension of said stays and comprising flexible members each actuating one of said stays, a screwthreaded reciprocating member connected with all said flexible members, a nut engaging said screwthreaded member to reciprocate it, a member mounted to oscillate around said nut, a cam on the shaft of the vehicle motor and able to oscillate said oscillatable member, a collar solid with said oscillatable member, reversible ratchet means between said collar and nut, means for carrying said oscillatable member in or out position for actuation by said cam, means for controlling said reversible ratchet means, and means actuated by said screwthreaded reciprocating member at the end of its strokes to make said oscillatable member inoperative.

3. Means for lifting a motor driven vehicle comprising extensible stays mounted on said vehicle, means for producing the extension of said stays and comprising flexible members each actuating one of said stays, a screwthreaded reciprocating member connected with all said flexible members, a nut engaging said screwthreaded member to reciprocate it, a member mounted to oscillate around said nut, a cam on the shaft of the vehicle motor and able to oscillate said oscillatable member, a collar solid with said oscillatable member, reversible ratchet means between said collar and nut, a member having fingers for controlling said ratchet means, control means operative on said finger carrying member and oscillatable member to control said ratchet means and to carry said oscillatable member in and out position for actuation by said cam, and means actuated by said screwthreaded reciprocating member at the end of its strokes to make said oscillatable member inoperative.

4. Means for lifting a motor driven vehicle comprising extensible stays mounted on said vehicle, means for producing the extension of said stays and comprising flexible members each actuating one of said stays, a screwthreaded reciprocating member connected with all said flexible members, a nut engaging said screwthreaded member to reciprocate it, a member mounted to oscillate around said nut, a cam on the shaft of the vehicle motor and able to oscillate said oscillatable member, a collar solid with said oscillatable member, reversible ratchet means between said collar and nut, a member having fingers for controlling said ratchet means, flexible control means operative on said finger carrying member to reverse the operation of said ratchet means, lost motion interengaging means on said oscillatable member and flexible control means to carry said oscillatable member in and out position for operation by said cam, and means actuated by said screwthreaded reciprocating member at the end of its strokes to make said oscillatable member inoperative.

5. Means for lifting a motor driven vehicle comprising extensible stays mounted on said vehicle, means for producing the extension of said stays and comprising flexible members each actuating one of said stays, means for collapsing said stays when said flexible actuating means are released, a screwthreaded reciprocating member connected with all said flexible members, a nut engaging said screwthreaded member to reciprocate it, a cam on the shaft of the engine motor, a member having arms embracing said cam with an intermediate play at least equal to double of the throw of said cam, said member being mounted to oscillate around said nut, spring return means for said oscillatable member, antifriction means on said arms for engaging said cam, a collar fast with said oscillatable member, reversible ratchet means intermediate said collar and nut, means for controlling said reversible ratchet means, means operating said controlling means, lost motion cooperating means on said operating means and oscillatable member to carry it with either of its arms in condition to be oscillated by said cam, and means actuated by said screwthreaded reciprocating member at the ends of its strokes to carry said oscillatable member in its intermediate inoperative position.

ARRIGO CAPELLO.